United States Patent
Goel

(10) Patent No.: US 8,873,625 B2
(45) Date of Patent: Oct. 28, 2014

(54) ENHANCED COMPRESSION IN REPRESENTING NON-FRAME-EDGE BLOCKS OF IMAGE FRAMES

(75) Inventor: Anurag Goel, Haryana (IN)

(73) Assignee: NVIDIA Corporation, Santa Clara, CA (US)

(*) Notice: Subject to any disclaimer, the term of this patent is extended or adjusted under 35 U.S.C. 154(b) by 1579 days.

(21) Appl. No.: 11/779,285

(22) Filed: Jul. 18, 2007

(65) Prior Publication Data
US 2009/0022219 A1 Jan. 22, 2009

(51) Int. Cl.
H04N 7/12 (2006.01)
H04N 19/61 (2014.01)
H04N 19/196 (2014.01)
H04N 19/176 (2014.01)
H04N 19/14 (2014.01)

(52) U.S. Cl.
CPC ... *H04N 19/00157* (2013.01); *H04N 19/00781* (2013.01); *H04N 19/00369* (2013.01); *H04N 19/00278* (2013.01)
USPC .............. 375/240.13; 375/240; 375/240.01; 375/240.12; 382/232; 382/236; 382/238

(58) Field of Classification Search
USPC .............. 375/240, 240.01, 240.12, 240.13; 382/232, 236, 238
See application file for complete search history.

(56) References Cited

U.S. PATENT DOCUMENTS

| | | |
|---|---|---|
| 3,679,821 A | 7/1972 | Schroeder |
| 4,177,514 A | 12/1979 | Rupp |
| 4,583,164 A | 4/1986 | Tolle |
| 4,591,979 A | 5/1986 | Iwashita |
| 4,644,461 A | 2/1987 | Jennings |
| 4,755,810 A | 7/1988 | Knierim |
| 4,814,978 A | 3/1989 | Dennis |
| 4,992,857 A | 2/1991 | Williams |
| 5,045,940 A | 9/1991 | Peters et al. |
| 5,130,797 A | 7/1992 | Murakami et al. |
| 5,146,324 A | 9/1992 | Miller et al. |
| 5,212,742 A | 5/1993 | Normile et al. |
| 5,225,875 A | 7/1993 | Shapiro et al. |
| 5,233,689 A | 8/1993 | Rhoden et al. |

(Continued)

FOREIGN PATENT DOCUMENTS

| | | |
|---|---|---|
| CN | 1489391 A | 4/2004 |
| EP | 1283640 | 2/2003 |

(Continued)

OTHER PUBLICATIONS

Jamil-Ur-Rehman and Dr. Zhang Ye, "Efficient Techniques for Signalling Intra Prediction modes of H.264/Mpeg-4 Part 10", Proceedings of the First International Conference on Innovative Computing, Information and Control, ICICIC, Year 2006, pp. 1-4.

(Continued)

*Primary Examiner* — Christopher Revak
*Assistant Examiner* — Sarah Su

(57) ABSTRACT

Using fewer bits to indicate the prediction mode used for encoding some of the non-frame-edge blocks of a frame. In an embodiment, fewer bits are used in case of boundary blocks of a slice, or slice group. In another embodiment, fewer bits are used when adjacent blocks are encoded using inter-frame coding or switchable intra-frame coding and such adjacent block cannot be used in predicting a block.

20 Claims, 10 Drawing Sheets

(56) References Cited

U.S. PATENT DOCUMENTS

| | | |
|---|---|---|
| 5,267,334 A | 11/1993 | Normille et al. |
| 5,267,344 A | 11/1993 | Nelson, III |
| 5,369,744 A | 11/1994 | Fukushima et al. |
| 5,371,896 A | 12/1994 | Gove et al. |
| 5,596,369 A | 1/1997 | Chau |
| 5,598,514 A | 1/1997 | Purcell et al. |
| 5,608,652 A | 3/1997 | Astle |
| 5,613,146 A | 3/1997 | Gove et al. |
| 5,623,311 A | 4/1997 | Phillips et al. |
| 5,630,033 A | 5/1997 | Purcell et al. |
| 5,646,692 A | 7/1997 | Bruls |
| 5,657,465 A | 8/1997 | Davidson et al. |
| 5,768,429 A | 6/1998 | Jabbi et al. |
| 5,790,881 A | 8/1998 | Nguyen |
| 5,809,538 A | 9/1998 | Pollmann et al. |
| 5,821,886 A | 10/1998 | Son |
| 5,845,083 A | 12/1998 | Hamadani et al. |
| 5,870,310 A | 2/1999 | Malladi |
| 5,883,823 A | 3/1999 | Ding |
| 5,889,949 A | 3/1999 | Charles |
| 5,898,881 A | 4/1999 | Miura et al. |
| 5,909,224 A | 6/1999 | Fung |
| 5,923,375 A | 7/1999 | Pau |
| 5,954,786 A | 9/1999 | Volkonsky |
| 5,969,728 A | 10/1999 | Dye et al. |
| 5,999,220 A | 12/1999 | Washino |
| 6,035,349 A | 3/2000 | Ha et al. |
| 6,073,185 A | 6/2000 | Meeker |
| 6,088,355 A | 7/2000 | Mills et al. |
| 6,098,174 A | 8/2000 | Baron et al. |
| 6,104,470 A | 8/2000 | Streefkerk et al. |
| 6,144,362 A | 11/2000 | Kawai |
| 6,148,109 A * | 11/2000 | Boon et al. ............. 382/238 |
| 6,157,751 A | 12/2000 | Olson et al. |
| 6,175,594 B1 | 1/2001 | Strasser et al. |
| 6,188,799 B1 | 2/2001 | Tan et al. |
| 6,195,389 B1 | 2/2001 | Rodriguez et al. |
| 6,222,883 B1 | 4/2001 | Murdock et al. |
| 6,269,174 B1 | 7/2001 | Koba et al. |
| 6,272,281 B1 | 8/2001 | De Vos et al. |
| 6,305,021 B1 | 10/2001 | Kim |
| 6,311,204 B1 | 10/2001 | Mills |
| 6,317,124 B2 | 11/2001 | Reynolds |
| 6,356,945 B1 | 3/2002 | Shaw et al. |
| 6,360,234 B2 | 3/2002 | Jain et al. |
| 6,418,166 B1 | 7/2002 | Wu et al. |
| 6,459,738 B1 | 10/2002 | Wu et al. |
| 6,539,060 B1 | 3/2003 | Lee et al. |
| 6,539,120 B1 | 3/2003 | Sita et al. |
| 6,560,629 B1 | 5/2003 | Harris |
| 6,647,062 B2 | 11/2003 | Mackinnon |
| 6,665,346 B1 | 12/2003 | Lee et al. |
| 6,687,788 B2 | 2/2004 | Vorbach et al. |
| 6,690,835 B1 | 2/2004 | Brockmeyer et al. |
| 6,690,836 B2 | 2/2004 | Natarajan et al. |
| 6,708,246 B1 | 3/2004 | Ishihara et al. |
| 6,721,830 B2 | 4/2004 | Vorbach et al. |
| 6,751,721 B1 | 6/2004 | Webb, Jr. et al. |
| 6,760,478 B1 | 7/2004 | Adiletta et al. |
| 6,782,052 B2 * | 8/2004 | Sun et al. ............. 375/240.12 |
| 6,799,192 B1 | 9/2004 | Handley |
| 6,807,317 B2 | 10/2004 | Mathew et al. |
| 6,823,443 B2 | 11/2004 | Horiyama et al. |
| 6,950,473 B2 | 9/2005 | Kim et al. |
| 6,993,639 B2 | 1/2006 | Schlansker et al. |
| 6,996,645 B1 | 2/2006 | Wiedenman et al. |
| 7,038,687 B2 | 5/2006 | Booth, Jr. et al. |
| 7,095,783 B1 | 8/2006 | Sotheran et al. |
| 7,173,631 B2 | 2/2007 | Anderson |
| 7,260,148 B2 | 8/2007 | Sohm |
| 7,277,101 B2 | 10/2007 | Zeng |
| 7,289,672 B2 | 10/2007 | Sun et al. |
| 7,379,501 B2 | 5/2008 | Lainema |
| 7,394,284 B2 | 7/2008 | Vorbach |
| 7,403,564 B2 | 7/2008 | Laksono |
| 7,450,640 B2 * | 11/2008 | Kim et al. ............. 375/240.12 |
| 7,499,491 B2 | 3/2009 | Lee et al. |
| 7,548,586 B1 | 6/2009 | Mimar |
| 7,548,596 B2 | 6/2009 | Yen et al. |
| 7,551,671 B2 | 6/2009 | Tyldesley et al. |
| 7,565,077 B2 | 7/2009 | Rai et al. |
| 7,581,076 B2 | 8/2009 | Vorbach |
| 7,581,182 B1 | 8/2009 | Herz |
| 7,630,097 B2 | 12/2009 | Kodama et al. |
| 7,689,000 B2 | 3/2010 | Kazama |
| 7,693,219 B2 | 4/2010 | Yan |
| 7,720,311 B1 | 5/2010 | Sriram |
| 7,721,069 B2 | 5/2010 | Ramchandran et al. |
| 7,924,923 B2 | 4/2011 | Lee et al. |
| 7,996,827 B2 | 8/2011 | Vorbach et al. |
| 8,009,923 B2 | 8/2011 | Li et al. |
| 8,369,402 B2 * | 2/2013 | Kobayashi et al. ...... 375/240.12 |
| 8,442,334 B2 * | 5/2013 | Drugeon et al. ............. 382/238 |
| 2001/0020941 A1 | 9/2001 | Reynolds |
| 2001/0024448 A1 | 9/2001 | Takase et al. |
| 2001/0028353 A1 | 10/2001 | Cheng |
| 2001/0028354 A1 | 10/2001 | Cheng et al. |
| 2002/0015445 A1 | 2/2002 | Hashimoto |
| 2002/0015513 A1 | 2/2002 | Ando et al. |
| 2002/0025001 A1 | 2/2002 | Ismaeil et al. |
| 2002/0041626 A1 | 4/2002 | Yoshioka et al. |
| 2002/0109790 A1 | 8/2002 | Mackinnon |
| 2002/0114394 A1 | 8/2002 | Ma |
| 2002/0118743 A1 | 8/2002 | Jiang |
| 2003/0020835 A1 | 1/2003 | Petrescu |
| 2003/0048361 A1 | 3/2003 | Safai |
| 2003/0078952 A1 | 4/2003 | Kim et al. |
| 2003/0141434 A1 | 7/2003 | Ishikawa et al. |
| 2003/0161400 A1 | 8/2003 | Dinerstein et al. |
| 2004/0057523 A1 * | 3/2004 | Koto et al. ............. 375/240.26 |
| 2004/0095998 A1 | 5/2004 | Luo et al. |
| 2004/0100466 A1 | 5/2004 | Deering |
| 2004/0150841 A1 | 8/2004 | Lieberman et al. |
| 2004/0156435 A1 | 8/2004 | Itoh et al. |
| 2004/0174998 A1 | 9/2004 | Youatt et al. |
| 2004/0181564 A1 | 9/2004 | MacInnis et al. |
| 2004/0181800 A1 | 9/2004 | Rakib et al. |
| 2004/0190613 A1 | 9/2004 | Zhu et al. |
| 2004/0190617 A1 | 9/2004 | Shen et al. |
| 2004/0202245 A1 | 10/2004 | Murakami et al. |
| 2004/0213348 A1 * | 10/2004 | Kim et al. ............. 375/240.12 |
| 2004/0218626 A1 | 11/2004 | Tyldesley et al. |
| 2004/0218675 A1 | 11/2004 | Kim et al. |
| 2004/0228415 A1 | 11/2004 | Wang |
| 2004/0257434 A1 | 12/2004 | Davis et al. |
| 2004/0268088 A1 | 12/2004 | Lippincott et al. |
| 2005/0008254 A1 | 1/2005 | Ouchi et al. |
| 2005/0033788 A1 | 2/2005 | Handley |
| 2005/0047502 A1 | 3/2005 | McGowan |
| 2005/0066205 A1 | 3/2005 | Holmer |
| 2005/0079914 A1 | 4/2005 | Kaido et al. |
| 2005/0105618 A1 | 5/2005 | Booth et al. |
| 2005/0123040 A1 | 6/2005 | Bjontegard |
| 2005/0190976 A1 | 9/2005 | Todoroki et al. |
| 2005/0238102 A1 | 10/2005 | Lee et al. |
| 2005/0238103 A1 | 10/2005 | Subramaniyan et al. |
| 2005/0265447 A1 * | 12/2005 | Park ............. 375/240.03 |
| 2005/0265454 A1 | 12/2005 | Muthukrishnan et al. |
| 2005/0276493 A1 | 12/2005 | Xin et al. |
| 2005/0281337 A1 * | 12/2005 | Kobayashi et al. ...... 375/240.18 |
| 2005/0286630 A1 * | 12/2005 | Tong et al. ............. 375/240.03 |
| 2006/0002466 A1 * | 1/2006 | Park ............. 375/240.03 |
| 2006/0017802 A1 | 1/2006 | Yoo et al. |
| 2006/0056513 A1 | 3/2006 | Shen et al. |
| 2006/0056708 A1 | 3/2006 | Shen et al. |
| 2006/0109910 A1 | 5/2006 | Nagarajan |
| 2006/0115001 A1 | 6/2006 | Wang et al. |
| 2006/0133501 A1 | 6/2006 | Lee et al. |
| 2006/0133506 A1 | 6/2006 | Dang |
| 2006/0176299 A1 | 8/2006 | Subbalakshmi et al. |
| 2006/0176962 A1 * | 8/2006 | Arimura et al. .......... 375/240.24 |
| 2006/0203916 A1 * | 9/2006 | Chandramouly et al. ............. 375/240.24 |
| 2006/0291563 A1 | 12/2006 | Park et al. |

(56) References Cited

U.S. PATENT DOCUMENTS

| | | | |
|---|---|---|---|
| 2007/0002945 A1* | 1/2007 | Kim | 375/240 |
| 2007/0002950 A1 | 1/2007 | Yang | |
| 2007/0036215 A1* | 2/2007 | Pan et al. | 375/240.12 |
| 2007/0070080 A1 | 3/2007 | Graham et al. | |
| 2007/0133689 A1 | 6/2007 | Park et al. | |
| 2007/0171981 A1 | 7/2007 | Qi | |
| 2007/0217506 A1* | 9/2007 | Yang et al. | 375/240.03 |
| 2007/0230564 A1 | 10/2007 | Chen et al. | |
| 2007/0274389 A1* | 11/2007 | Kim et al. | 375/240.16 |
| 2007/0286284 A1 | 12/2007 | Ito et al. | |
| 2007/0286508 A1 | 12/2007 | Le Leannec et al. | |
| 2008/0069203 A1 | 3/2008 | Karczewicz et al. | |
| 2008/0117214 A1 | 5/2008 | Perani et al. | |
| 2008/0137726 A1 | 6/2008 | Chatterjee et al. | |
| 2008/0151997 A1* | 6/2008 | Oguz | 375/240.02 |
| 2008/0285444 A1 | 11/2008 | Diab et al. | |
| 2009/0060277 A1 | 3/2009 | Zhang et al. | |
| 2009/0086827 A1 | 4/2009 | Wu et al. | |
| 2009/0116549 A1* | 5/2009 | Shen et al. | 375/240.02 |
| 2009/0122864 A1* | 5/2009 | Palfner et al. | 375/240.12 |
| 2009/0161763 A1 | 6/2009 | Rossignol et al. | |
| 2009/0196350 A1* | 8/2009 | Xiong | 375/240.12 |
| 2009/0268974 A1* | 10/2009 | Takagi | 382/238 |
| 2010/0034268 A1* | 2/2010 | Kusakabe et al. | 375/240.15 |
| 2010/0118943 A1* | 5/2010 | Shiodera et al. | 375/240.12 |
| 2013/0170553 A1* | 7/2013 | Chen et al. | 375/240.16 |
| 2013/0294507 A1* | 11/2013 | Song et al. | 375/240.12 |

FOREIGN PATENT DOCUMENTS

| | | |
|---|---|---|
| GB | 2348559 | 3/1999 |
| JP | 04162893 | 6/1992 |
| JP | 11096138 | 4/1999 |
| JP | 2001184323 | 7/2001 |
| JP | 2005-192232 | 7/2005 |
| JP | 2005354686 | 12/2005 |
| JP | 2006287315 | 10/2006 |
| JP | 2006287315 A2 | 10/2006 |
| WO | 9827742 | 6/1998 |
| WO | 02/33650 | 4/2002 |
| WO | 0233650 | 4/2002 |
| WO | 2005001625 | 6/2003 |
| WO | 2005096168 | 10/2005 |
| WO | 2006/085137 | 8/2006 |
| WO | 2006085137 | 8/2006 |

OTHER PUBLICATIONS

Advanced Video Coding for generic audiovisual services, Telecommunication Standardization Sector of ITU, Dated Mar. 2005, pp. 1-343.

"Ralf Schafer et al.,", "H.264/AVC", Dated: Jan. 2003, pp. 1-12.

_The Merriam-Webster Dictionary_. 2005 ed. Springfield, MA: Merriam-Webster Inc., 2005.

3D Graphics Processor for Mobile Set Based on Configurable Processor; Takemoto, Takashi et al., Oct. 2004.

A Single-Chip Video/Audio Codec for Low Bit Rate Application Seongmo Park, Seongmin Kim, Igkyun Kim, Kyungjin Byun, Jin Jong Cha, and Hanjin Cho, ETRI Journal, vol. 22, No. 1, Mar. 2000, pp. 20-29.

Andrew Gibson, "H.264 Video Encoding Standard", year Aug. 2002, pp. 1-98, Queens University Kingston Ontario Canada.

Chen, Hao et al., "Adaptive FMO Selection Strategy for Error Resilient H.264 Coding" International Conference on Audio, Language and Image Processing, 2008. ICALIP 2008, Jul. 7-9, 2008, pp. 868-872.

Hannuksela, Miska et al., "Random Access Using Isolated Regions", IEEE 2003, pp. III-841 to III to 844.

Iwasaki, I.; Naganuma, J.; Nitta, K.; Yoshitome, T.; Ogura, M.; Nakajima, Y.; Tashiro, Y.; Onishi, T.; Ikeda, M.; Endo, M., "Single-chip MPEG-2 422P@HL CODEC LSI with multi-chip configuration for large scale processing beyond HDTV level," Design, Automation and Test in Europe Conference and Exhibition, Mar. 2003.

Tung-Chien Chen; Yu-Wen Huang; Liang-Gee Chen, "Analysis and design of macroblock pipelining for H.264/AVC VLSI architecture," Circuits and Systems, 2004. ISCAS '04. Proceedings of the 2004 International Symposium on, vol. 2, No., pp. 11-273-6 vol. 2, May 23-26, 2004.

Jong, et al., "Accuracy Improvement and Cost Reduction of 3-Step Search Block Matching Algorithm for Video Coding", Feb. 1, 1994, IEEE Transaction on Circuits and Systems for Video Technology, vol. 4 No. 1, pp. 88-90, XP000439487.

Mizuno, M. et al.; "A 1.5-W single-chip MPEG-2 MP@ML video encoder with low power motion estimation and clocking," Solid-State Circuits, IEEE Journal of, vol. 32, No. 11, pp. 18-7-1816, Nov. 1997.

Realization of Low-Bit_Ratio Video Encoder Using Mpact Media Processor; Iwasaki, Junichi et al.; 1997.

Rohini Krishnan, et al., "Design of a 2D DCT/IDCT Application Specific VLIW Processor Supporting Scaled and Sub-sampled Blocks," 16th International Conference on VLSI Design, 2003, six pages.

Shih-Hao Wang et al.; "A platform-based MPEG-4 advanced video coding (AVC) decoder with block level pipelining," Information, Communications and Signal Processing, 2003 and the Fourth Pacific Rim Conference on Multimedia Proceedings of the 2003 Joint Conference of the Fourth International Conference on, vol. 1, No., p. 51-55 vol. 1, Dec. 2003.

Tourapis et al., Proc. of SPIE Conf. Vis. Comm. And Img. Processing, vol. 3, pp. 1365-1373, Jun. 2000.

Tu, C., Liang, J., and Tran, T. "Adaptive Runlength Coding", in_IEEE Signal Processing Letters_vol. 10, No. 3, pp. 61-66. Mar. 2003.

Zheng at al., "Optimization of MPEG-4 Video Encoder", Multimedia Technology Research Center, The Hong Kong University of Science and Technology, Clear Water Bay, Hong Kong, 2001.

* cited by examiner

FIG. 3

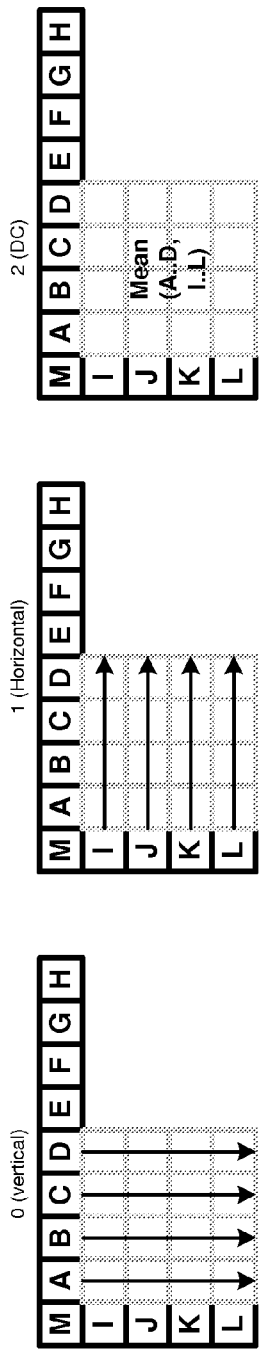
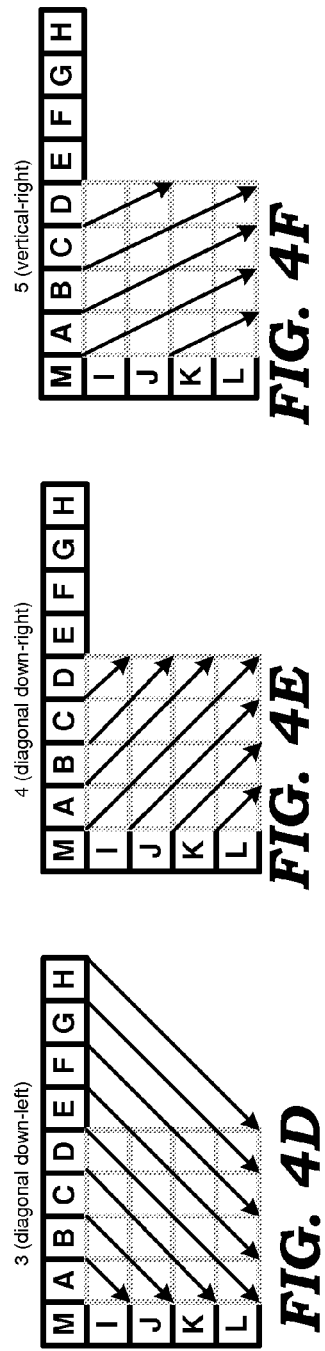
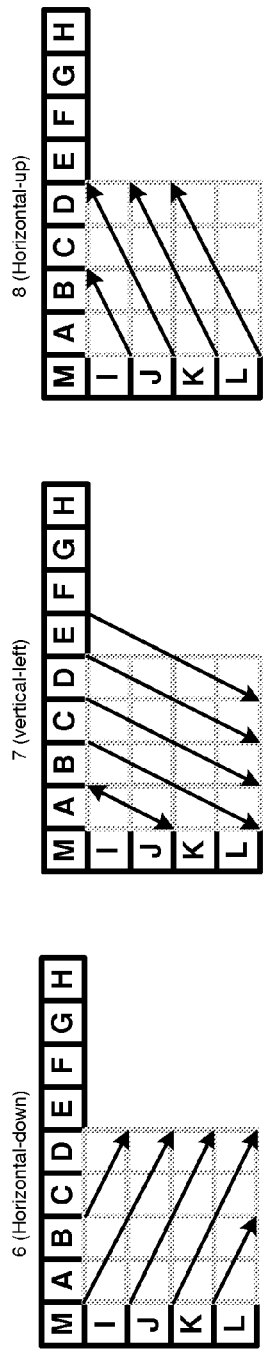
FIG. 4A  FIG. 4B  FIG. 4C
FIG. 4D  FIG. 4E  FIG. 4F
FIG. 4G  FIG. 4H  FIG. 4I

FIG. 5

ENHANCED COMPRESSION IN REPRESENTING NON-FRAME-EDGE BLOCKS OF IMAGE FRAMES

BACKGROUND

1. Field of Disclosure

The present disclosure relates generally to data compression technologies, and more specifically to obtaining enhanced compression in representing non-edge blocks of image frames.

2. Related Art

Image frames are often represented in compressed form. For example, a sequence of image frames are generated from a video signal capturing a scene of interest, and the frames are compressed, typically either for reducing storage space or for reducing transmission bandwidth requirements. H.264, described in further detail in "Information technology—Coding of audio-visual objects—Part 10: Advanced Video Coding", available from ISO/IEC (International Standards Organization/International Electrotechnical Commission), is an example approach using which image frames are represented in compressed form.

Blocks are often used as a basis for compression of image frame. For example, in the H.264 standard noted above, a frame is divided into blocks of (4×4, 8×8 or 16×16 pixels) size. However, the blocks can be of other shapes (e.g., rectangle or non-uniform shape) and/or sizes in alternative standards. For clarity, the term source block is used to refer to uncompressed representation and compressed block is used to refer to compressed representation.

Typically, a predicted block is generated associated with each source block using a prediction mode, and the compressed representation is generated as a difference of each corresponding pixel of the predicted block and the source block. H.264 standard refers to prediction modes such as horizontal prediction mode, vertical prediction mode, etc., in which adjacent pixels (immediately left and/or above) are used to predict each pixel of the predicted block according to the prediction approach.

Each image frame may be viewed as containing blocks at the frame edges and non-frame-edges. A frame-edge block refers to a block, which has at least one pixel at the boundary of the image frame. A non-frame-edge refers to a block, which does not have any pixels at the boundary of the image frame. As may be appreciated for a frame having (A×B) pixels, there would be a total of (2A+2B−4) pixels at the boundary.

At least as image frames need to be represented in compressed form, there is a general need to represent non-frame-edge blocks also in compressed form. It is often desired that the compression be enhanced so that the number of bits used in representing the data is correspondingly reduced.

BRIEF DESCRIPTION OF THE DRAWINGS

Example embodiments will be described with reference to the following accompanying drawings, which are described briefly below.

FIG. 3 depicts the blocks in an example frame containing two slice groups.

FIGS. 4A-4I represent the various prediction modes available (for luminance data) in an embodiment.

FIG. 5 depicts blocks in an example frame containing multiple slices in a slice group.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Figure 1:
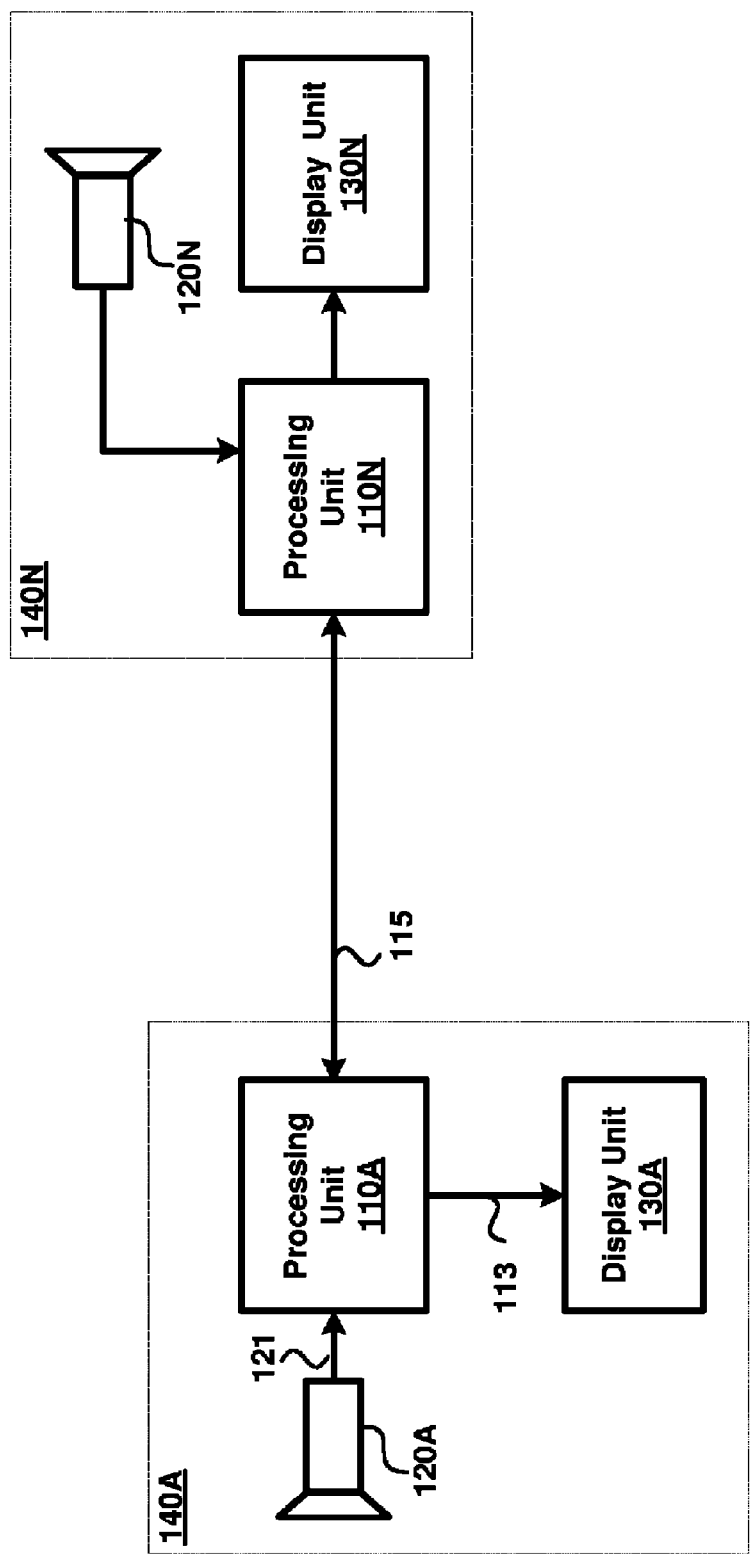
FIG. 1 is a diagram illustrating an example environment in which several features of the present invention may be implemented.

An aspect of the present invention uses fewer bits to indicate the prediction mode used for some of the non-frame-edge blocks compared to the number of bits used for other blocks. Due to the use of fewer bits, enhanced compression is obtained.

According to another aspect of the present invention, an encoder recognizes only a subset of possible prediction modes may be available for blocks in certain conditions and uses fewer bits to indicate the prediction modes associated with such blocks. A decoder may also be designed to apply a complementary technique to decode such blocks.

An example of such a situation is a boundary block of a slice. As is well known, a slice contains a set of blocks and an encoding policy may indicate that the blocks external to a slice may not be used to encode the blocks within the slice. Accordingly, the number of available prediction modes for at least some of the boundary blocks in a slice may be less than the total number of possible modes.

Another example of such a situation is when adjacent blocks are encoded using inter-mode prediction techniques (in which each adjacent block is predicted based on data in prior frames), and a encoding approach (e.g., H.264 standard) does not permit use of such adjacent blocks in predicting a block. Accordingly, fewer bits may be used to indicate the prediction approach for the block.

Yet another example of such a situation is when adjacent blocks are encoded using switchable intra-prediction techniques, which makes it possible of a decoder in a receiving device to switch between two bit streams without affecting decoding precision, and it may be undesirable to use such adjacent block for predicting a block. Thus, fewer bits may be used to indicate the prediction approach for the block.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention. Further more the features/aspects described can be practiced in various combinations, though only some of the combinations are described herein for conciseness.

2. Definitions

The following includes definitions of selected terms used throughout the disclosure. Both singular and plural forms of all terms fall within each meaning:

Scene: A general area sought to be captured in video format.

Image: The picture represented by the light captured by an image capture device.

Image Frame: A set of pixel values representing a captured image viewed as a two dimensional area.

Block: A group of adjacent pixels with a desired dimension and shape.

Frame-edge-block: A block with at least one pixel located at an edge (boundary) of an image frame.

Non-frame-edge block: A block having no pixels located at an edge of an image frame.

Source block: A block before compression.

Compressed block: A source block after compression.

Pixel location: The coordinates of the pixel in the frame.

3. Example Environment

FIG. 1 is a diagram illustrating an example environment in which several features of the present invention may be implemented. The example environment is shown containing only representative systems for illustration. However, real-world environments may contain many more systems/components as will be apparent to one skilled in the relevant arts by reading the disclosure provided herein. Implementations in such environments are also contemplated to be within the scope and spirit of various aspects of the present invention.

The diagram is shown containing end systems 140A and 140N designed/configured to communicate with each other in a video conferencing application. End system 140A is shown containing processing unit 110A, video camera 120A and display unit 130A, and end system 140N is shown containing processing unit 110N, video camera 120N and display unit 130N. Each component is described in detail below.

Video camera 120A captures images of a scene, and forwards the captured image (in the form of corresponding video frames) to processing unit 110A on path 121. Processing unit 110A may compress each video frame received from video camera 120A, and forward the compressed video frames on path 115. Path 115 may contain various transmission paths (including networks, point to point lines, etc.), but providing a bandwidth for transmission of the video data. Alternatively, processing unit 110A may store the compressed images in a memory (not shown). Processing unit 110A may also receive compressed video data from end system 140N, and forward the decoded video data to display unit 130A on path 113 for display.

Processing unit 110N, video camera 120N and display unit 130N respectively operate similar to the corresponding components of end system 140A, and the description is not repeated for conciseness. In particular, end system 140N may decompress image frames received from end system 140A and display the decompressed images on display unit 130N.

End systems 140A and 140N represent example systems implemented according to several aspects of the present invention.

In compressing an image frame, processing unit 110A may divide an entire frame into blocks, and apply compression techniques in a block-wise fashion. As noted above, processing unit 110A may perform enhanced compression in representing non-frame-edge blocks of an image frame. First, diagrams clarifying some of the terms used in the description of the present application are provided next.

The manner in which enhanced compression can be obtained according to several aspects of the present invention, is illustrated next with respect to a flowchart.

4. Representing Non-Frame-Edge Blocks

Figure 2:
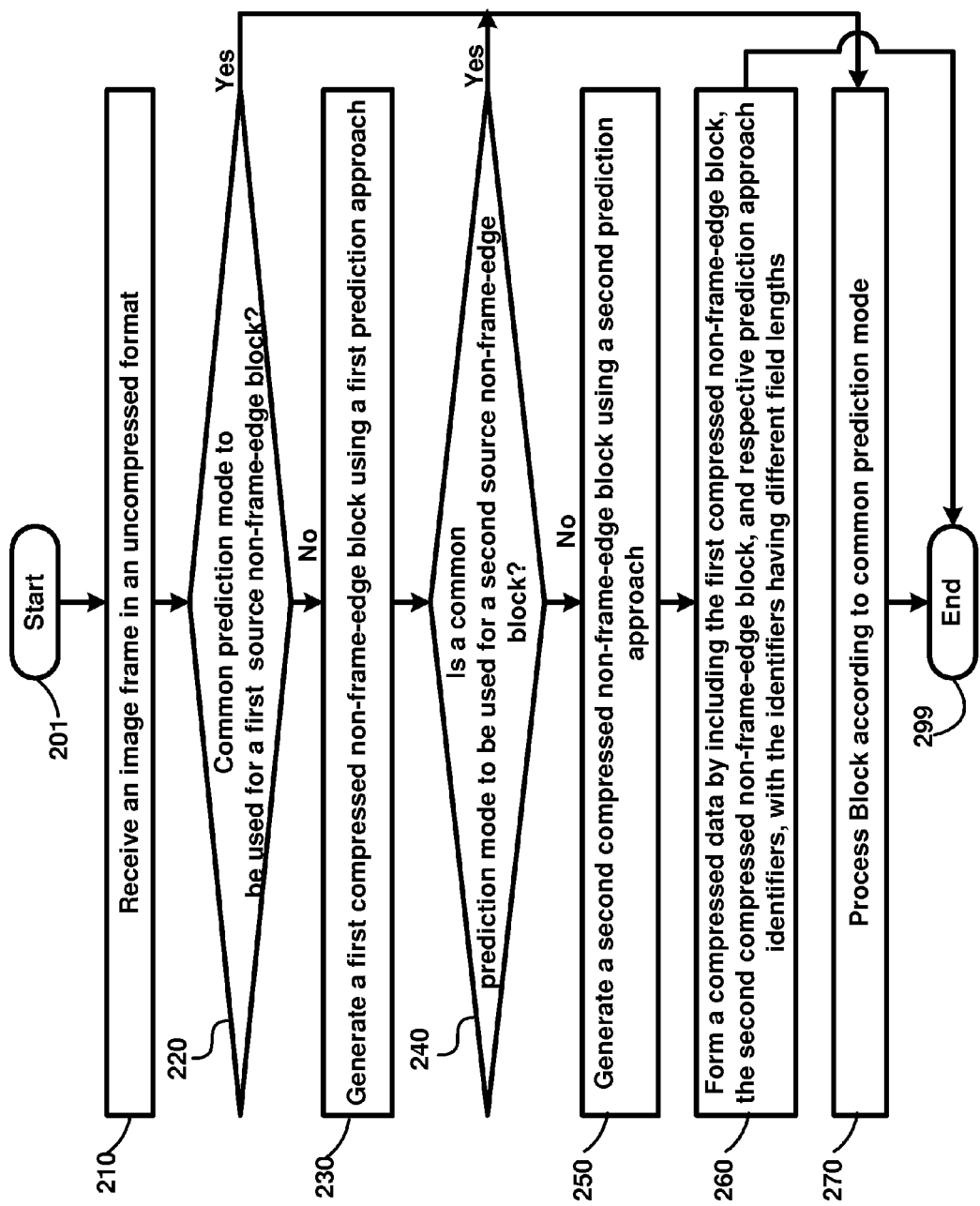
FIG. 2 is a flowchart illustrating the manner in which enhanced compression in representing non-frame-edge-blocks may be obtained according to an aspect of the present invention.

FIG. 2 is a flowchart illustrating the manner in which enhanced compression in representing non-frame-edge-blocks may be obtained according to an aspect of the present invention. The flowchart is described with respect to FIG. 1, and in relation to processing unit 110A, merely for illustration. However, various features can be implemented in other environments and other components.

Furthermore, the steps are described in a specific sequence merely for illustration. Alternative embodiments in other environments, using other components, and different sequence of steps can also be implemented without departing from the scope and spirit of several aspects of the present invention, as will be apparent to one skilled in the relevant arts by reading the disclosure provided herein.

Only the details as believed to be necessary for an understanding of the operation of the described embodiments are provided herein for conciseness. The flowchart starts in step 201, in which control passes immediately to step 210.

In step 210, processing unit 110A receives an image frame in an uncompressed format. Uncompressed format merely indicates that the data is further compressed as described below. The image frame may be received in any of possible formats such as RGB, YUV, etc., from camera 120A. Processing unit 110A may divide the image frame into blocks (e.g., of size 8×8 or 16×16 pixels) according to any of well-known approaches to facilitate further processing.

Figure 3:
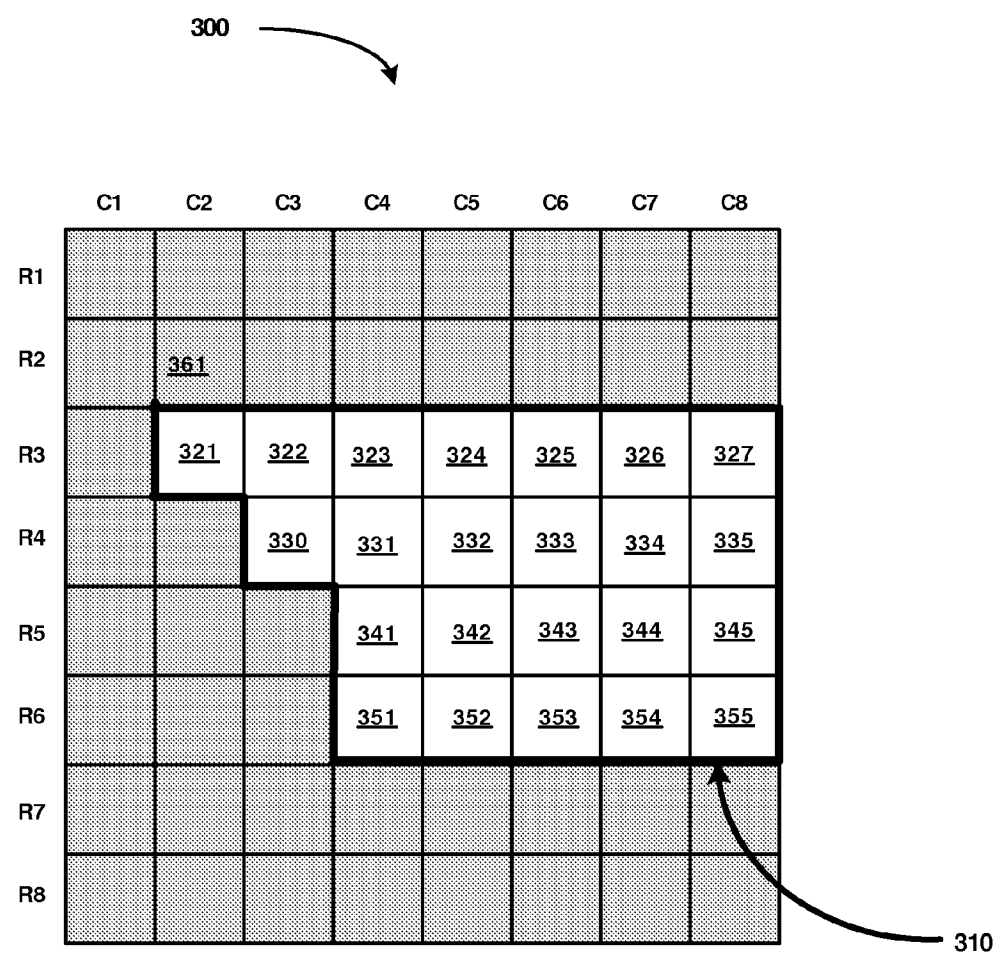

An image frame may contain multiple frame-edge-blocks and non-frame-edge-blocks, as depicted in FIG. 3. The Figure shows source image frame 300 containing eight rows and eight columns of blocks. The rows are marked R1 through R8 and the columns are marked C1 through C8. Blocks in rows R1 and R8, and columns C1 and C8 represent blocks that lie on a boundary (edge) of frame 300, and are termed frame-edge-blocks. As may be appreciated each frame-edge-block contains one or more pixels, which are at the boundary of the frame. The remaining blocks are termed as non-frame-edge-blocks. Control then passes to step 220.

Continuing with reference to FIG. 2 again, in step 220, processing unit 110A checks whether a common prediction mode is to be used for a first source non-frame-edge block. A prediction mode generally refers to a technique to be used to generate a predicted block from a source block, and compression is generally achieved based on the predicted block. A common prediction mode generally refers to a prediction mode, which can be determined by the decoder, when a simple indication such as a single bit flag indicates that the decoder can make such determination without the need for additional bits to indicate the prediction mode (which would be used when common prediction mode is not used).

In H.264 standard, a flag is set to indicate that a default prediction mode ("most probable mode") is used to encode a block and that mode can be determined (by a decoder) as the prediction approach used with a majority of blocks to the left and top of a block. The default prediction mode represents an example common prediction mode. If processing unit 110A determines that a common prediction mode is to be used, control passes to step 270, else control passes to step 230.

In step 230, processing unit 110A performs a compression operation on the first source non-frame-edge-block using a first prediction approach to generate a first compressed non-frame-edge-block. As is well known, a compression block is generally formed as a difference of (the corresponding pixels of) the predicted block and the corresponding source block. Processing unit 110A may select a prediction approach from a set of possible prediction approaches (e.g., subset of standard specified prediction approaches), as illustrated below. Processing unit 110A also generates a prediction identifier specifying the selected prediction approach. Control then passes to step 240.

In step 240, processing unit 110A checks whether a common prediction mode is to be used for a second source non-frame-edge block, with the second source non-frame-edge-block being the same size and shape as the first source non-frame-edge-block. In case of chroma data, common prediction mode may not be used, at least in H.264 type standards. If processing unit 110A determines that a common prediction mode is to be used, control passes to step 270, else control passes to step 250.

In step 250, processing unit 110A, performs a compression operation on the second source non-frame-edge-block using a second prediction approach to generate a second compressed non-frame-edge-block. Processing unit 110A may select a prediction approach from the standard specified prediction approaches, as illustrated below. Processing unit 110A also generates a prediction identifier specifying the selected prediction approach. Control then passes to step 260.

In step 260, processing unit 110A forms a compressed data by including the first compressed non-frame-edge block, the second compressed non-frame-edge block, and the respective prediction approach identifiers, with the identifiers having different field lengths. The compressed data may also include a flag indicating that common prediction mode was not used for either of the blocks.

The compressed data may represent the entire image frame or portions of it in a compressed form, and may include information (such as size/dimension/shape of each of the corresponding source blocks) to enable a device (such as processing unit 110N of FIG. 1) to decompress the image frame accurately. Processing unit 110A may either store the compressed data representing the image frame or transmit the data to a recipient system such as end-system 140N. Control then passes to step 299, in which the flowchart ends.

In step 270, processing unit 110A processes the corresponding block according to the common prediction mode. The compressed data formed in such a scenario may contain a flag, which indicates that a common prediction mode is used, and the prediction approach identifiers are not included in the compressed data generated. The block may be encoded in a known way (e.g., as specified in the H.264 standard). Control then passes to step 299, in which the flowchart ends.

The flowchart of FIG. 2 may be repeated as many times as needed to complete encoding of all blocks of a frame.

Due to the use of fewer bits in indicating the compression mode associated with at least some of the non-frame-edge blocks noted above, enhanced compression is obtained in representing the image frame. Such enhanced compression may be achieved based on various recognitions as applicable to relevant encoding/decoding standards. Some example recognitions and the resulting compression are described below in further details with examples.

5. Fewer Bits to Indicate Some Non-Edge Frame Blocks

An aspect of the present invention obtains reduced compression based on a recognition that some prediction modes are not inherently available for some of the non-edge frame blocks. One such situation is for the blocks at the left and top edges of slices in the H.264 standard. The situation can be appreciated based on various total set of available prediction modes in the standard, and accordingly the available prediction modes are briefly described below with respect to FIGS. 4A-4I.

FIG. 4A represents a vertical mode in which pixels A-D are copied to the pixel position in the respective columns to generate the 4×4 prediction block. Pixels A-D are related to adjacent blocks (of the same present frame), and may have been used for encoding already.

FIG. 4B represents horizontal encoding in which pixels I-L are respectively copied into corresponding rows. FIG. 4C represents D.C. mode, which is average of all 8 pixels A-D and I-L are computed and copied to all 16 pixels sought to be predicted. FIGS. 4D-4I respectively represent diagonal down-left, diagonal down-right, vertical right, horizontal down, vertical left, and horizontal up direction as may be readily observed from the Figures, and also described in the H.264 standard.

It may be appreciated that the nine prediction modes of FIGS. 4A-4I would require four bits to identify the specific prediction approach used. An aspect of the present invention recognizes that some prediction modes are inherently not applicable in case of some blocks at the slice boundaries, as described below.

6. Slices and Slice Groups

Referring again to FIG. 3, image frame 300 is shown divided into two slice groups. In general, a slice group represents a set of blocks, which have to be encoded independent of other blocks (blocks which are present within the frame). A frame may be divided into different slice groups, for example, for error resilience or to use more bits (on average) for encoding blocks in one slice group and fewer bits for encoding blocks in another slice group.

In image frame 300, the first slice group is represented by slice group 310 containing blocks 321-327, 330-335, 341-345 and 351-355. The second slice group contains all blocks not contained in slice group 310. When encoding a block, processing unit 110A may use information only from other blocks lying in the same slice group.

Thus, for example, processing unit 110A may not use information (such as pixel values) in block 361 to encode any of blocks in slice group 310. However, information in blocks 321-327, 330-335, 341-345 and 351-355 may potentially be used to encode each other, but often only immediately adjacent blocks are permitted to be used by standards such as H.264.

Thus, when encoding (generating a predicted block) block 330 of image frame 300, modes shown in FIGS. 4B, 4E, 4F, 4G and 4I are not applicable, and thus the prediction mode can be specified using 3 bits (a first prediction approach, to specify one of modes 4A, 4C, 4D and 4H).

On the other hand, as an example, all nine modes are available for encoding (predicting) block 342, and thus the prediction mode can be specified using 4 bits (second prediction approach). Thus, fewer bits may be used to represent block 330 as compared to block 342.

Figure 5:
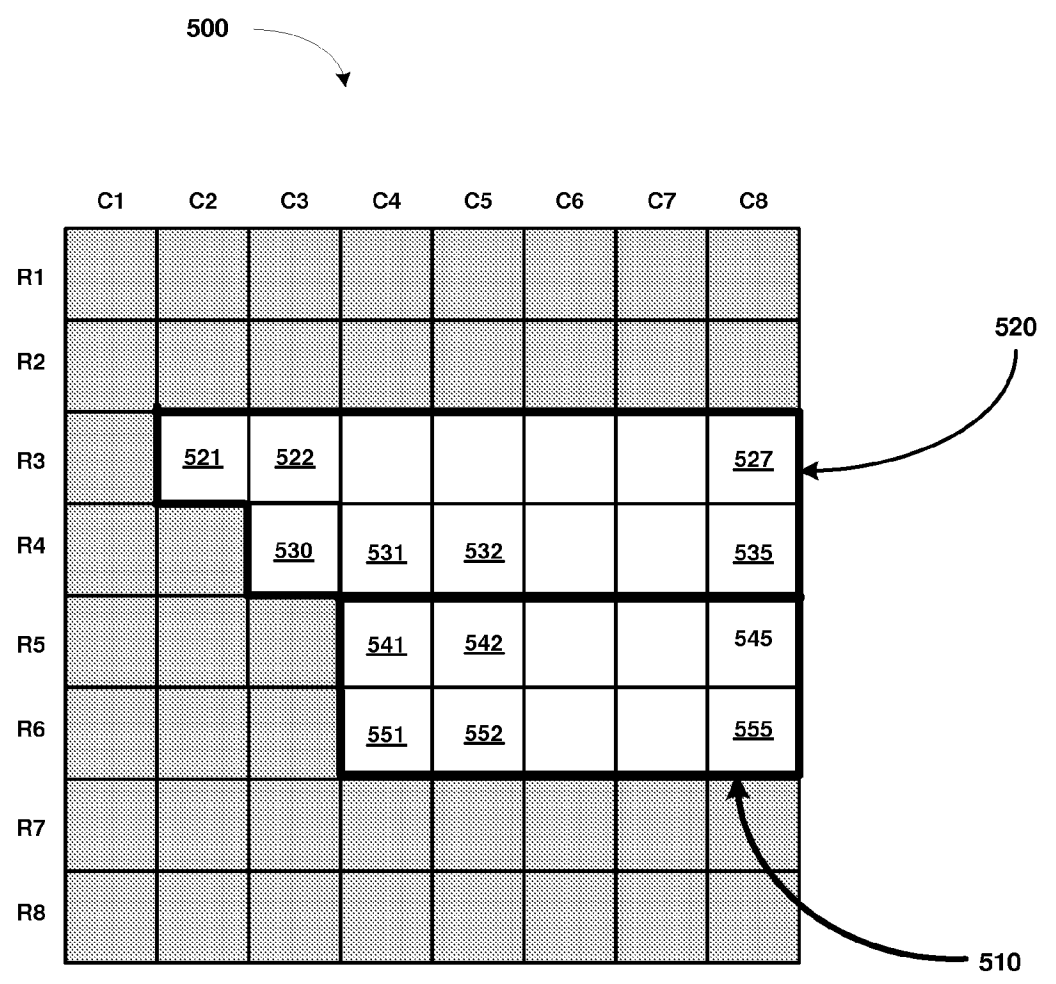

The frame of FIG. 3 is shown containing only a single slice in each slice group. However, a slice group can contain multiple slices, (for instance, to provide greater error resilience in decoding the corresponding blocks) within it, as shown in FIG. 5. Image frame 500 is shown containing a first slice group with slice 510 (containing blocks 541-545 and 551-555) and slice 520 (containing blocks 521-527 and 530-535). The second slice group contains all blocks not contained in slices 510 and 520.

Since blocks within a slice are encoded independently of blocks outside the slice, another condition in which some prediction modes are not inherently available for some of the non-edge frame blocks occurs when encoding blocks contained in a slice. Thus, with respect to FIG. 5, when encoding block 542 only modes 4B, 4C and 4I are applicable, and thus the prediction mode can be specified using only two bits (first prediction approach). And, when encoding block 521 or 541 only mode 4C is applicable, and thus the prediction mode can be specified without using any bits, i.e., 0 bits are required to indicate self evident single mode 4C.

On the other hand, as an example, all nine modes are available for encoding (predicting) block 552, and thus the prediction mode can be specified using 4 bits (second prediction approach). Thus, fewer bits may be used to represent block 542 as compared to block 552.

7. Inter-Mode Predicted Adjacent Blocks

Yet another condition in which some prediction modes are not inherently available for some non-edge frame blocks occurs when blocks adjacent to a block to be predicted have been encoded using other prediction modes (such as inter-prediction mode or switchable-intra prediction mode specified by the H.264 standard). Inter-prediction mode generally refers to a mode in which a block is predicted using pixel information from a corresponding block in one or more previous frames. As noted above, switchable intra-prediction mode refers to a technique (also described in H.264 standard), which makes it possible for a decoder/receiver to switch between two streams (of different bandwidth and/or resolution, etc.) without affecting the decoding quality. Switchable intra-prediction facilitates dynamic switching among multiple streams to accommodate bandwidth variability. Switchable intra-prediction also enables random access and fast-forward actions in a bitstream.

In such scenarios, the adjacent blocks are not permitted (e.g., in the case of inter-prediction mode for adjacent blocks) or not desirable (e.g., in case of switchable intra-prediction mode) to be used for predicting a block, thereby precluding some of the possible prediction modes.

Figure 6:
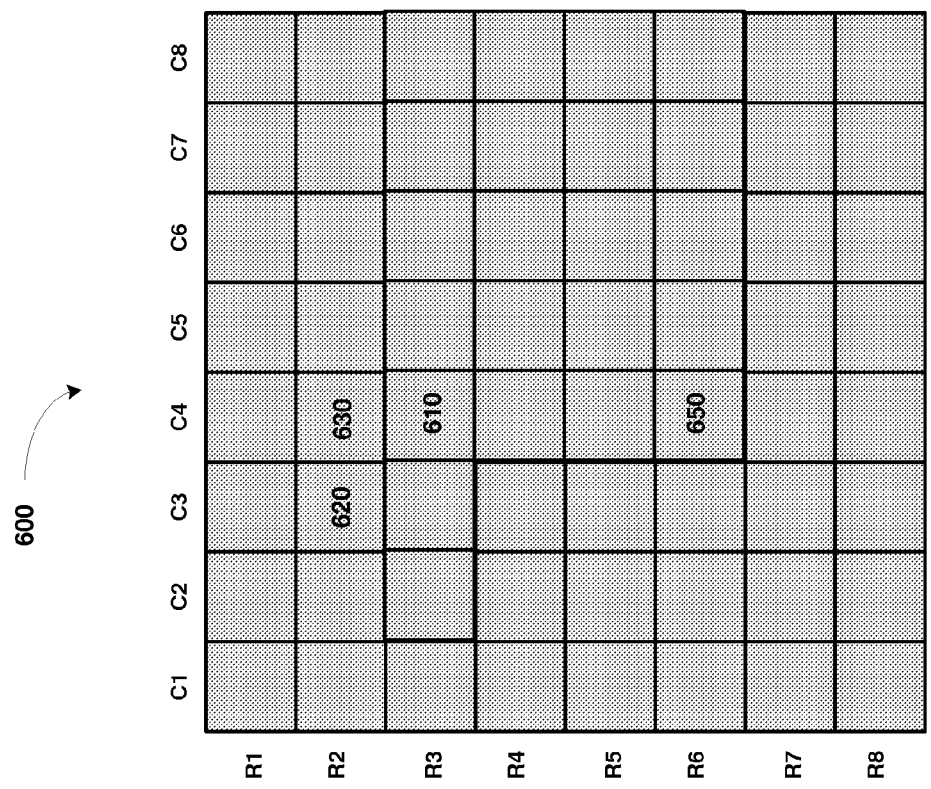
FIG. 6 depicts blocks in an example frame containing blocks used to illustrate the non-availability of some prediction modes in more contexts.

An example scenario is shown in FIG. 6, in which only blocks 620 and 630 in image frame 600 are assumed to be predicted using inter prediction mode. Thus, when encoding block 610, modes shown in FIGS. 4A, 4D, 4E, 4F, 4G and 4H are not applicable, and thus the prediction mode can be specified using only two bits to specify one of modes 4B, 4C and 4I (first prediction approach).

On the other hand, as an example, all nine modes are available for encoding (predicting) block 650, and thus the prediction mode can be specified using 4 bits (second prediction approach). Thus, fewer bits may be used to represent block 610 as compared to block 650.

It should be appreciated that each of the squares in FIGS. 3, 5 and 6 is assumed to conveniently represent a block. In case of FIGS. 3 and 5, when implemented in H.264 type standards, each slice is deemed to have integer number of macro-blocks, with each macro-block in turn having multiple blocks. Assuming each of FIGS. 3 and 5 is a 4×4 block and a macro-block is 16×16, more rows and columns would be present in each slice than shown in the two Figures.

Thus, it may be appreciated from the foregoing description that processing unit 110A may use fewer bits to represent some non-frame-edge blocks in an image frame. As a result, enhanced compression may be achieved in representing at least such blocks.

It should be appreciated that generating the compressed data using prediction modes requires other operations not described above. Such other operations may be understood in the context of an example encoder described in detail below.

8. Encoder

Figure 7:
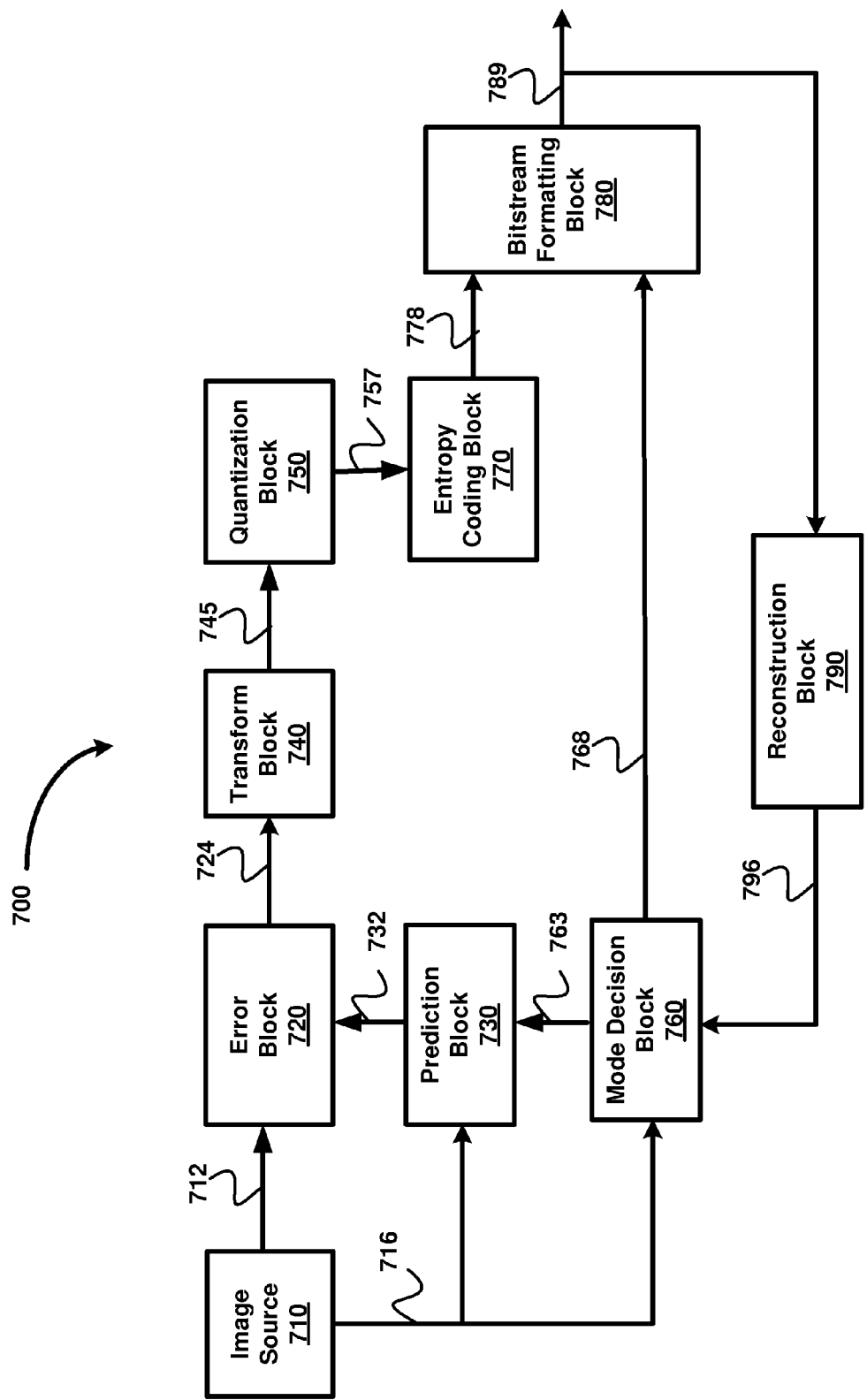
FIG. 7 is a block diagram illustrating the details of an encoder in an embodiment.

FIG. 7 is block diagram of the internal details of an encoder 700 implementing several features of the present invention in one embodiment. The encoder may be implemented within processing unit 110A or externally (e.g., using custom ASICs). Only some of the details as pertinent to the features described above are shown for conciseness. The diagram is shown containing image source 710, error block 720, prediction block 730, transform block 740, quantization block 750, mode decision block 760, entropy coding block 770, bit formatting block 780 and reconstruction block 790. Each block is described below in detail.

Image source 710 represents a source generating a stream of image frames, with each image frame being represented by a corresponding set of pixel values. Each image frame may be provided in its entirety or as blocks. Each block represents a portion of the image frame and is referred to as a source block.

Prediction block 730 generates a predicted block from a source block received on path 716 using a prediction approach (as described in sections above) specified by mode decision block 760 on path 763. In particular, with reference to FIG. 2 above, prediction block 730 may use (as indicated by mode decision block 760) a first prediction approach to represent some non-frame-edge blocks, and a second prediction approach to represent other non-frame edge-blocks, as described above. In addition, for coding inter blocks prediction block 730 may perform other operations such as motion compensation, well known in the relevant arts.

Error block 230 generates a residue (difference) block, with each data point in the residue block representing the difference of corresponding pixel values of source image block received on path 712 and predicted block received on path 732 (each having the same number of pixels). A matrix (residue block) representing the data points is provided on path 724. The difference block may contain the same number of elements (data points) as in the original block.

Transform block 740 transforms the difference (residue) block received on path 724 into a compressed block. In general, the transformation is designed such that the compressed block can be represented by a fewer number of bits compared to those in the difference block (and original block as well). The transformation may be obtained by performing a mathematical operation on the elements of the difference block. In an embodiment, the transformation corresponds to a discrete cosine transformation (DCT) or integer DCT.

Quantization block 750 further digitizes (quantizes) the (individual elements of) compressed block received on path 745 to represent the elements of compressed block with a desired number of bits. Entropy coding block 770 further compresses the bit stream (representing the quantized and compressed blocks) received from quantization block 750 on path 757 using entropy coding techniques, well known in the relevant arts.

Bit stream formatting block 780 receives the compressed, quantized and entropy coded error information/bits from entropy coding block 770 on path 778, as well as the output of mode decision block 760 (described below) on path 768. Bitstream formatting block 780 arranges the error bits and the output of mode decision block 760 in a suitable format and forwards the formatted bits on path 789. The formatted bits represent a compressed image (including all the content noted above in step 260) frame and may be either transmitted or stored.

Reconstruction block 790 reconstructs the previously coded (and formatted) blocks/image frames received on path 789. Reconstruction block 790 may perform inverse operations (inverse quantization, inverse transform, etc.) corresponding to blocks 740, 750 and 770. Blocks/Image frames thus reconstructed are provided on paths 796 (as reconstructed blocks/image frames).

Mode decision block 760 determines the prediction approach (as described in detail above) as well as the specific one of the prediction mode (for example a specific one of modes illustrated in FIGS. 4A-4I) that is to be used to encode a block in an image frame. Mode decision block may select either a default (common) prediction mode to encode a block, or one of prediction approaches as described above.

In an embodiment, if mode decision block 760 uses a default prediction mode, then mode decision block 760 sets a 'default mode' flag to a logic 1. When using a non-default prediction mode to encode a block, it sets the 'default mode' flag to logic 0, and also generates corresponding 'prediction mode' bits specifying which specific one of the multiple non-default prediction modes has been selected to encode the block.

As an example, assuming mode decision block 760 uses prediction mode shown in FIG. 4A for block 342 (FIG. 3), it sets the 'default mode' flag to logic 0, and sets the 'prediction mode' bits (prediction identifier) to a value 000 (3-bit binary). On the other hand, assuming (the same) prediction mode 4A is used for block 330 (FIG. 3), mode decision mode block 760 sets the 'default mode' flag to logic 0, but sets the 'prediction mode' bits (prediction identifier) to a value 00 (2-bit binary).

Mode decision block 760 specifies the prediction approach to prediction block 730, and forwards the 'default mode' flag as well as the prediction identifier (if present) to bit formatting block 780 on path 768. Mode decision block 760 may determine the number of bits to be used for specifying the prediction identifier in the compressed data and provides the corresponding information also to bit formatting block 780 (which uses the specified number of bits in the compressed data). Thus, mode decision block 760 may need to be implemented to identify the specific blocks which can be encoded with fewer bits, consistent with the approaches described above.

Mode decision block 760 may also forward to bit formatting block 780 bits specifying the shape and size of a block, slice/slice group information, and if adjacent blocks are encoded using other encoding modes such as inter-frame mode etc, the type of data (for example whether luma or chroma) represented by the block, and other information to enable a device such as end system 140N to accurately decompress the blocks in the compressed image frame. For further detail on the information that may be sent in an example scenario, the reader is referred to the H.264 standard.

A system/device such as processing unit 110N (or end system 140N) may receive the compressed image frame transmitted by processing unit 110A (or end system 140A), and operate to recover the image frame by decompressing the data. The manner in which processing unit 110N decompresses the compressed data is described next with respect to a flowchart.

9. Decoding

Figure 8:
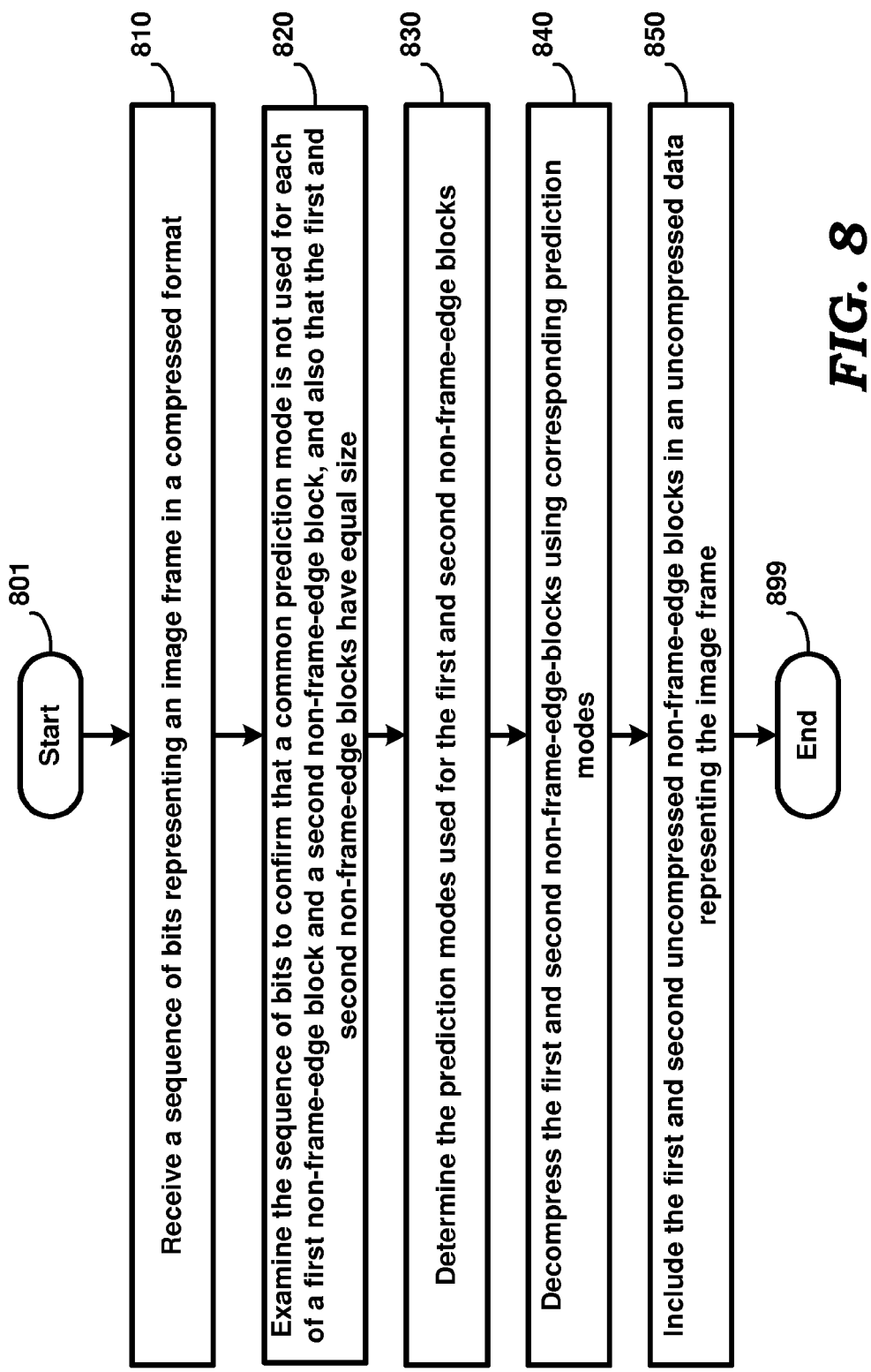
FIG. 8 is a flowchart illustrating the manner in which compressed blocks may be recovered in an embodiment of the present invention.

FIG. 8 is a flowchart illustrating the manner in which a image frame in uncompressed format may be recovered from compressed data according to an aspect of the present invention. Again, the flowchart is described with respect to FIG. 1, merely for illustration. However, various features can be implemented in other environments and other components. Furthermore, the steps are described in a specific sequence merely for illustration. The flowchart is described as being implemented within processing unit 110N, even though each processing unit may be implemented with the features of both FIGS. 2 and 8.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 801, in which control passes immediately to step 810.

In step 810, processing unit 110N receives a sequence of bits representing a compressed image frame, with the image frame containing multiple frame-edge blocks and multiple non-frame-edge blocks. The compressed image frame may contain various information noted above with respect to the encoding operations. Control then passes to step 820.

In step 820, processing unit 110N, examines the sequence of bits to confirm that a common prediction mode is not used for each of a first non-frame-edge block and a second non-frame-edge block, and also that the first and second non-frame-edge blocks have equal size. Processing unit 110N may examine the value of corresponding 'default mode' flags bits indicating whether a common prediction mode has been used for the respective blocks, and information bits as noted above to make such a confirmation. Control then passes to step 830.

In step 830, processing unit 110N determines a first set of bits indicating the prediction mode using which the first non-frame-edge block is encoded and a second set of bits indicating the prediction mode using which the second non-frame-edge block is encoded. Assuming that the features described above with respect to FIGS. 2-7 have been used (either by convention or by appropriate signaling data, for example, included in the compressed data), processing unit 110N may determine the specific number of bits used for indicating the corresponding prediction modes.

For illustration it is assumed that processing unit 110N determined that fewer bits would represent the first set of bits than the second set of bits. As an example, processing unit 110N may determine that 000 (3-bit binary) specifies the prediction mode for (compressed) block 342 (FIG. 3), and that 00 (2-bit binary) specifies the prediction mode for block 330 (FIG. 3). Thus, processing unit 110N also needs to be implemented with the understanding of the features described above with respect to FIGS. 2-7. Control then passes to step 840.

In step 840, processing unit 110N generating a first uncompressed non-frame-edge block and a second uncompressed non-frame-edge block using the corresponding prediction modes (as indicated by the first and second set of bits respectively) and the 'information bits'. Control then passes to step 850.

In step 850, processing unit 110N includes the first and second uncompressed non-frame-edge blocks in an uncompressed data representing the image frame. Control then passes to step 899 in which the flowchart ends.

It should be appreciated that the features of FIG. 8 are generally embodied in various decoders. An embodiment of a decoder providing the features noted above is described next briefly.

10. Decoder

Figure 9:
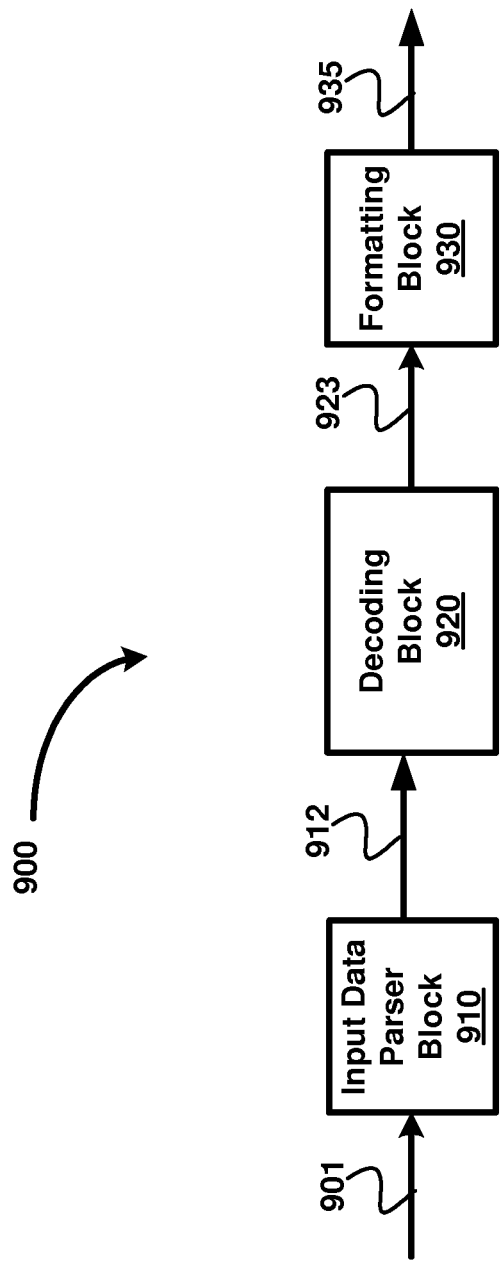
FIG. 9 is a block diagram illustrating the details of a decoder in an embodiment.

FIG. 9 is a block diagram of a decoder operating to recover (decode) a compressed image frame in an embodiment. Decoder 900 is shown containing input data parser block 910, decoding block 920 and formatting block 930. Each block is described briefly below.

Input data parser block 910 receives a bit stream 901 representing a compressed image frame. The compressed image frame may contain frame edge as well as non-frame edge blocks. In particular, the bit stream may contain some non-frame edge-blocks represented using a fewer number of bits, and some other non-frame-edge-blocks represented using relatively more number of bits using corresponding prediction approaches, as described in detail above.

Input data parser block 910 examines the bit stream and determines the corresponding prediction mode used for a block as described above with respect to FIG. 8. In addition input data parser block 910 also determines prediction approach (prediction identifiers) from the 'compressed bitstream' noted above. Input data parser block 910 forwards the bits representing a compressed block and the prediction mode used for the block to decoding block 920 on path 912.

Decoding block 920 recovers the source (decompressed) block corresponding to a compressed block using the inputs received from input data parser block 910, as well as previously decompressed blocks which may be retrieved from a storage unit (not shown). Decoding block 920 may substantially perform the reverse of the corresponding operations used to compress and encode a source block, such as performed by blocks 720, 740, 750, and 770 of FIG. 7. Decoding block 920 forwards a decoded block to formatting block 930 on path 923.

Formatting block 930 recreates a complete (or portion of) decompressed image frame 935 from the various decompressed blocks received from decoding block 920. The decompressed image frame may be created in any of suitable formats.

It may be appreciated that the image frames and the encoding approaches described above correspond to luminance blocks (luma) and each block may correspond to 4×4 pixels. However, the features can be extended to cover other types of data forming an image frame (e.g., chroma) and for other block sizes, without departing from the scope and spirit of various aspects of the present invention, as will be apparent to one skilled in the relevant arts by reading the disclosure provided herein. Further, in case of chroma blocks, according to some conventions (e.g., H.264), common/default prediction mode may not be applicable and thus not used for such blocks (in steps 220 and 240).

Processing unit 110A/processing unit 110N implementing several features noted may be implemented using any combination of hardware, software, and firmware. An embodiment in which the features are implemented substantially in software is described next.

11. Software Implementation

Figure 10:
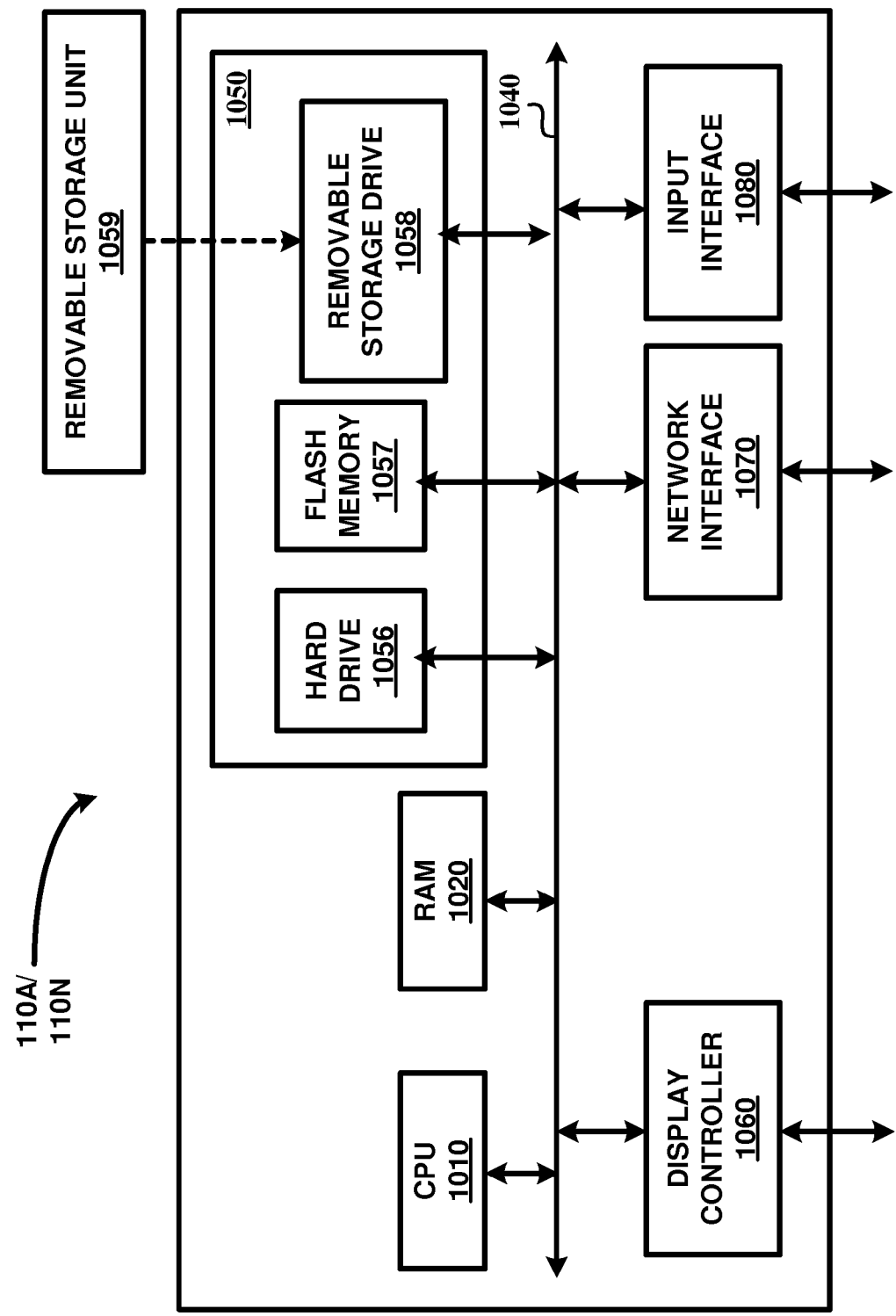
FIG. 10 is a block diagram of a digital processing system in which several features of the present invention are operative upon execution of appropriate software instructions.

FIG. 10 is a block diagram illustrating the details of processing unit 110A in an embodiment. The description below also applies to processing unit 110N. Processing unit 110A may contain one or more processors such as central processing unit (CPU) 1010, random access memory (RAM) 1020, secondary storage unit 1050, display controller 1060, network interface 1070, and input interface 1080. All the components may communicate with each other over communication path 1040, which may contain several buses as is well known in the relevant arts. The components of FIG. 10 are described below in further detail.

CPU 1010 may execute instructions stored in RAM 1020 to provide several features of the present invention. CPU 1010 may contain multiple processing units, with each processing unit potentially being designed for a specific task. Alternatively, CPU 1010 may contain only a single general purpose processing unit. RAM 1020 may receive instructions from secondary storage unit 1050 using communication path 1040. In addition, RAM 1020 may store video frames received from a video camera during the encoding operations noted above.

Display controller 1060 generates display signals (e.g., in RGB format) to display unit 130A (FIG. 1) based on data/instructions received from CPU 1010.

Network interface 1070 provides connectivity to a network (e.g., using Internet Protocol), and may be used to receive/transmit coded video/data frames on path 115 of FIG. 1. Input interface 1080 may include interfaces such as keyboard/mouse, and interface for receiving video frames from video camera 120A.

Secondary storage unit 1050 may contain hard drive 1056, flash memory 1057, and removable storage drive 1058. Some or all of the data and instructions may be provided on removable storage unit 1059, and the data and instructions may be read and provided by removable storage drive 1058 to CPU 1010. Floppy drive, magnetic tape drive, CD_ROM drive, DVD Drive, Flash memory, removable memory chip (PCM-CIA Card, EPROM) are examples of such removable storage drive 1058. Alternatively, data and instructions may be copied to RAM 1020 from which CPU 1010 may execute. Groups of software instructions (for example, in compiled/object form or post linking in a form suitable for execution by CPU 1010) are termed as code.

Removable storage unit 1059 may be implemented using medium and storage format compatible with removable storage drive 1058 such that removable storage drive 1058 can read the data and instructions. Thus, removable storage unit 1059 includes a computer readable storage medium having stored therein computer software and/or data.

In general, the computer (or generally, machine) readable medium refers to any medium from which processors can read and execute instructions. The medium can be randomly accessed (such as RAM 1020 or flash memory 1057), volatile, non volatile, removable or non removable, etc. While the computer readable medium is shown being provided from within processing unit 110A for illustration, it should be appreciated that the computer readable medium can be provided external to processing unit 110A as well.

In this document, the term "computer program product" is used to generally refer to removable storage unit 1059 or hard disk installed in hard drive 1056. These computer program products are means for providing software to CPU 1010. CPU 1010 may retrieve the software instructions, and execute the instructions to provide various features of the present invention described above.

12. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of representing an image frame containing a plurality of source frame-edge blocks and a plurality of source non-frame-edge blocks, said method comprising:

receiving a first plurality of pixels representing said image frame in an uncompressed format, said first plurality of pixels representing said plurality of source frame-edge blocks and said plurality of source non-frame-edge blocks;

prior to encoding a first source non-frame-edge block of said image frame and a second source non-frame-edge block of said image frame, selecting a first prediction approach to encode said first source non-frame-edge block and selecting a second prediction approach to encode said second source non-frame-edge block, wherein said first prediction approach is selected from a first subset of available prediction approaches that is selected from a plurality of prediction approaches, wherein said first subset is selected by eliminating, prior to said encoding, prediction approaches from said plurality of prediction approaches based on a location of said first source non-frame edge block in a slice in said image frame, wherein said second prediction approach is selected from a second subset of available prediction approaches that is selected from said plurality of prediction approaches, wherein said second subset is selected by eliminating, prior to said encoding, prediction approaches from said plurality of prediction approaches based on a location of said second source non-frame edge block in a slice in said image frame, wherein the number of available prediction approaches in said first subset is less than the number of available prediction approaches in said second subset;

generating a compressed first non-frame-edge block and a second compressed non-frame-edge block using said first prediction approach and said second prediction approach respectively;

forming a compressed data by including said first compressed non-frame-edge block, said second compressed non-frame-edge block, a first field corresponding to said first compressed non-frame-edge block, and a second field corresponding to said second compressed non-frame-edge block, wherein said first field and said second field respectively identify said first prediction approach and said second prediction approach;

wherein said first source non-frame-edge block and said second source non-frame-edge block are equal in size, and wherein the number of bits in said first field corresponds to said number of available prediction approaches in said first subset and the number of bits in said second field corresponds to said number of available prediction approaches in said second subset, wherein said number of bits in said first field is less than said number of bits in said second field.

2. The method of claim 1, wherein said generating generates a compressed non-frame-edge block by computing a difference of a corresponding source non-frame-edge block and a corresponding predicted block, wherein said corresponding predicted block is generated using a corresponding prediction approach.

3. The method of claim 2, wherein said first source non-frame-edge block is at a boundary of a first slice in said image frame.

4. The method of claim 3, wherein said first slice is in a slice group containing a plurality of slices.

5. The method of claim 1, wherein said forming includes a third field and a fourth field in said compressed data, wherein said third field and said fourth field respectively indicate that a common prediction mode is not used for said first compressed non-frame-edge block and said second compressed non-frame-edge block.

6. The method of claim 1, further comprising:

receiving an indication that said first source non-frame-edge block is to be encoded using an intra-prediction mode and blocks adjacent to said first source non-frame-edge-block are to be coded using an another prediction mode, wherein said forming uses different number of bits for said first field and said second field based on said indication.

7. The method of claim 6, wherein said another prediction mode comprises one of inter-prediction mode or switchable-intra prediction mode, and said indication further indicates not to use adjacent blocks for compression.

8. The method of claim 1, wherein said image frame is represented according to H.264 standard.

9. A method of decompressing an image frame, said image frame containing a plurality of frame-edge blocks and a plurality of non-frame-edge blocks, said method comprising:

receiving a sequence of bits representing said image frame in a compressed format;

prior to encoding a first source non-frame-edge block of said image frame and a second source non-frame-edge block of said image frame, examining said sequence of bits to confirm that a common prediction mode is not used for each of said first non-frame-edge block and said second non-frame-edge block, wherein said common prediction mode is one prediction mode of a plurality of prediction modes used for respective corresponding adjacent blocks, said examining also confirming that said first non-frame-edge block and said second non-frame-edge block have equal size;

determining a first set of bits indicating a prediction mode for encoding a first non-frame-edge block and a second set of bits indicating a prediction mode for encoding a second non-frame-edge block, wherein said first set of bits and said second set of bits respectively specify a first prediction approach and a second prediction approach, wherein said first prediction approach is selected from a first subset of available prediction approaches that is selected from a plurality of prediction approaches, wherein said first subset is selected by eliminating, prior to said encoding, prediction approaches from said plurality of prediction approaches based on a location of said first source non-frame edge block in a slice of said image frame, wherein said second prediction approach is selected from a second subset of available prediction approaches that is selected from said plurality of prediction approaches, wherein said second subset is selected by eliminating, prior to said encoding, prediction approaches from said plurality of prediction approaches based on a location of said second source non-frame edge block in a slice of said image frame, wherein the number of available prediction approaches in said first subset is less than the number of available prediction approaches in said second subset;

identifying compressed bits representing said first non-frame-edge block and said second non-frame-edge block, wherein said first non-frame-edge block and said second non-frame-edge block have equal size;

generating a first uncompressed non-frame-edge block and a second uncompressed non-frame-edge block using said first prediction approach and said second prediction approach respectively; and including said first uncompressed non-frame-edge block and said second uncompressed non-frame-edge block in a uncompressed data representing said image frame, wherein the number of bits in said first set of bits corresponds to said number of available prediction approaches in said first subset and the number of bits in said second set of bits corresponds to said number of available prediction approaches in said second subset, wherein said number of bits in said first set of bits is less than said number of bits in said second set of bits.

10. The method of claim 9, wherein said first non-frame-edge block is at a boundary of a first slice in said image frame.

11. The method of claim 10, wherein said first slice is in a slice group containing a plurality of slices.

12. The method of claim 9, wherein said sequence of bits includes a third field and a fourth field, wherein said third field and said fourth field respectively indicate that said common prediction mode is not used for said first compressed non-frame-edge block and said second compressed non-frame-edge block.

13. The method of claim 9, wherein said sequence of bits indicates that said first source non-frame-edge block is encoded using a intra-prediction mode and blocks adjacent to said first source non-frame-edge-block are encoded using another prediction mode, wherein said determining determines the number of bits for said first field to be different from said second field based on said indication.

14. The method of claim 13, wherein said another prediction mode comprises one of inter-prediction mode or switchable-intra prediction mode, and said indication further indicates not to use adjacent blocks for decompression.

15. The method of claim 9, wherein said image frame is represented according to H.264 standard.

16. A computer readable storage device unit storing one or more sequences of instructions for causing a system to encode an image frame, wherein execution of said one or more sequences of instructions by one or more processors contained in said system causes said system to perform actions comprising:

receiving a first plurality of pixels representing said image frame in an uncompressed format, said first plurality of pixels representing a plurality of source frame-edge blocks and a plurality of source non-frame-edge blocks;

prior to encoding a first source non-frame-edge block of said image frame and a second source non-frame-edge block of said image frame, selecting a first prediction approach to encode said first source non-frame-edge block and a second prediction approach to encode said second source non-frame-edge block, wherein said first prediction approach is selected from a first subset of available prediction approaches that is selected from a plurality of prediction approaches, wherein said first subset is selected by eliminating, prior to said encoding, prediction approaches from said plurality of prediction approaches based on a location of said first source non-frame edge block in a slice group in a slice of said image frame, wherein said second prediction approach is selected from a second subset of available prediction approaches that is selected from said plurality of prediction approaches, wherein said second subset is selected by eliminating, prior to said encoding, prediction approaches from said plurality of prediction approaches based on a location of said second source non-frame edge block in a slice group of said slice of said image frame, wherein the number of available prediction approaches in said first subset is less than the number of available prediction approaches in said second subset;

generating a compressed first non-frame-edge block and a second compressed non-frame-edge block using said first prediction approach and said second prediction approach respectively;

forming a compressed data by including said first compressed non-frame-edge block, said second compressed non-frame-edge block, a first field and a second field, wherein said first field and said second field respectively identify said first prediction approach and said second prediction approach;

wherein said first source non-frame-edge block and said second source non-frame-edge block have equal size, and wherein the number of bits in said first field corresponds to said number of available prediction approaches in said first subset and the number of bits in said second field corresponds to said number of available prediction approaches in said second subset, wherein said number of bits in said first field is less than said number of bits in said second field.

17. The computer readable storage device of claim 16, further comprising:

receiving a sequence of bits representing another image frame in said compressed format;

examining said sequence of bits to confirm that a common prediction mode is not used for each of a third non-frame-edge block and a fourth non-frame-edge block, wherein said common prediction mode is used for respective corresponding adjacent blocks, said examining also confirming that said third non-frame-edge block and said fourth non-frame-edge block have equal size;

determining a third set of bits indicating a prediction mode used for encoding a third non-frame-edge block and a fourth set of bits indicating a prediction mode used for encoding a fourth non-frame-edge block, wherein the number of bits in said third set of bits is not equal to the number of bits in said fourth set of bits, wherein said third set of bits and said fourth set of bits respectively specify a third prediction approach and a fourth prediction approach;

identifying respective compressed bits representing said third non-frame-edge block and said fourth non-frame-edge block;

generating a third uncompressed non-frame-edge block and a fourth uncompressed non-frame-edge block using said third prediction approach and said fourth prediction approach respectively; and including said third uncompressed non-frame-edge block and said fourth uncompressed non-frame-edge block in uncompressed data representing said another image frame.

18. An apparatus for processing image frames, said apparatus comprising:

means for receiving a first plurality of pixels representing a first image frame in an uncompressed format, said first plurality of pixels representing a plurality of source frame-edge blocks and a plurality of source non-frame-edge blocks;

means for selecting, prior to encoding a first source non-frame-edge block of said image frame and a second source non-frame-edge block of said image frame, a first prediction approach to encode said first source non-frame-edge block and a second prediction approach to encode said second source non-frame-edge block, wherein said first prediction approach is selected from a first subset of available prediction approaches that is selected from a plurality of prediction approaches, wherein said first subset is selected by eliminating, prior to said encoding, prediction approaches from said plurality of prediction approaches based on a location of said first source non-frame edge block in a slice in a slice group in said image frame, wherein said second prediction approach is selected from a second subset of available prediction approaches that is selected from said plurality of prediction approaches, wherein said second subset is selected by eliminating, prior to said encoding, prediction approaches from said plurality of prediction approaches based on a location of said second source non-frame edge block in a slice in a slice group in said image frame, wherein the number of available prediction approaches in said first subset is less than the number of available prediction approaches in said second subset;

means for generating a compressed first non-frame-edge block and a second compressed non-frame-edge block using said first prediction approach and said second prediction approach respectively; and means for forming a compressed data by including said first compressed non-frame-edge block, said second compressed non-frame-edge block, a first field and a second field, wherein said first field and said second field respectively identify said first prediction approach and said second prediction approach;

wherein said first source non-frame-edge block and said second source non-frame-edge block have equal size, and wherein the number of bits in said first field corresponds to said number of available prediction approaches in said first subset and the number of bits in said second field corresponds to said number of available prediction approaches in said second subset, wherein said number of bits in said first field is less than said number of bits in said second field.

19. The apparatus of claim 18, further comprising:

means for receiving a sequence of bits representing another image frame in said compressed format;

means for examining said sequence of bits to confirm that a common prediction mode is not used for each of a third non-frame-edge block and a fourth non-frame-edge block, wherein said common prediction mode is used for respective corresponding adjacent blocks, said means for examining also confirms that said third non-frame-edge block and said fourth non-frame-edge block have equal size;

means for determining a third set of bits indicating a prediction mode used to encode a third non-frame-edge block and a fourth set of bits indicating a prediction mode used to encode a fourth non-frame-edge block, wherein the number of bits in said third set of bits is not equal to the number of bits in said fourth set of bits, wherein said third set of bits and said fourth set of bits respectively specify a third prediction approach and a fourth prediction approach;

means for identifying respective compressed bits representing said third non-frame-edge block and said fourth non-frame-edge block;

means for generating a third uncompressed non-frame-edge block and a fourth uncompressed non-frame-edge block using said third prediction approach and said fourth prediction approach respectively; and means for including said third uncompressed non-frame-edge block and said fourth uncompressed non-frame-edge block in a uncompressed data representing said another image frame.

20. The apparatus of claim 19, wherein said compressed format and said uncompressed format are according to H.264.

* * * * *